Aug. 4, 1931.  C. H. CHAPIN  1,817,675
SHOCK ABSORBING DEVICE
Filed Dec. 12, 1928  3 Sheets-Sheet 1
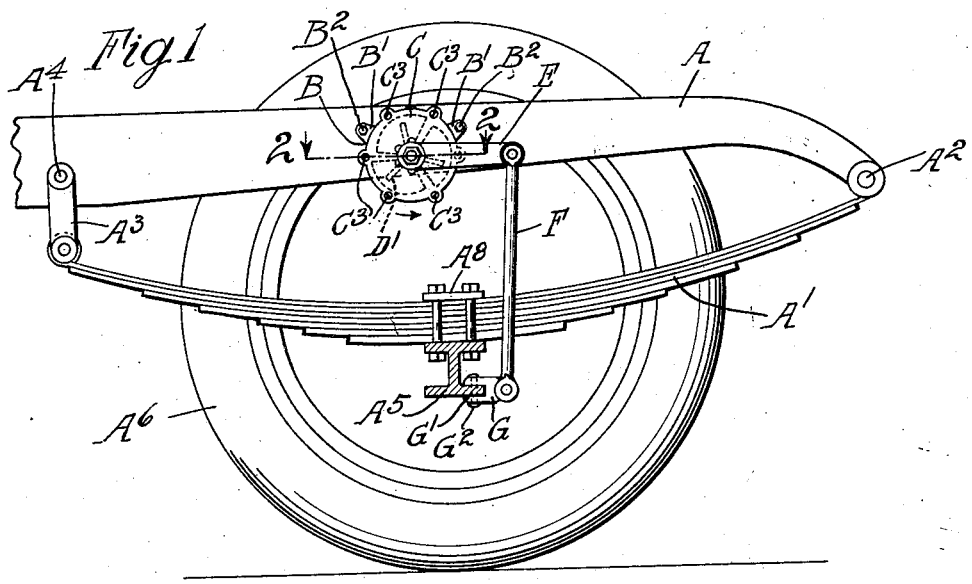
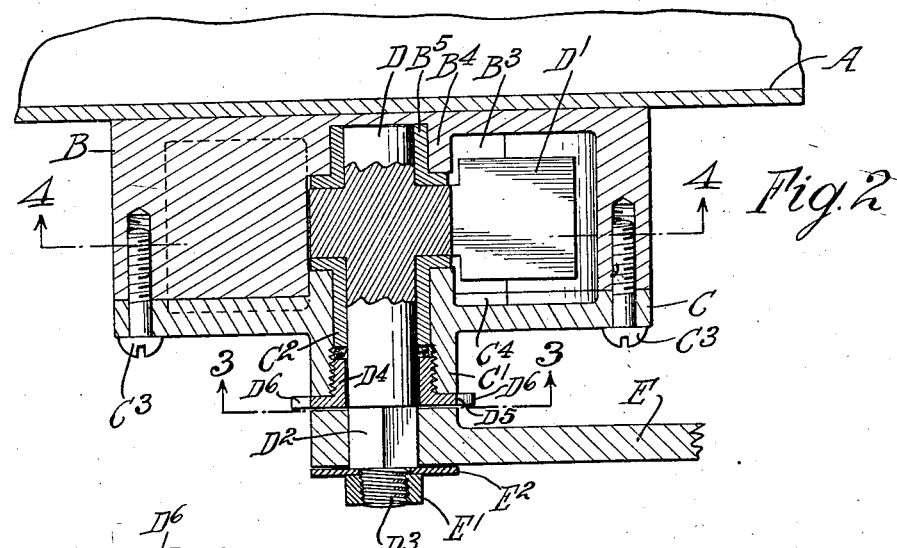
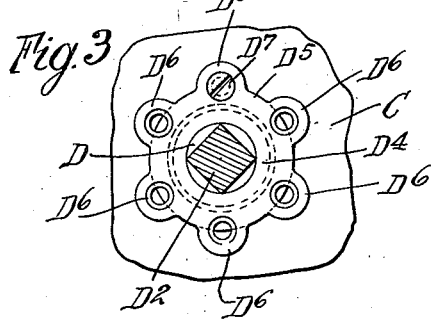
Inventor
Charles H. Chapin
by Parker & Carter
Attorneys.

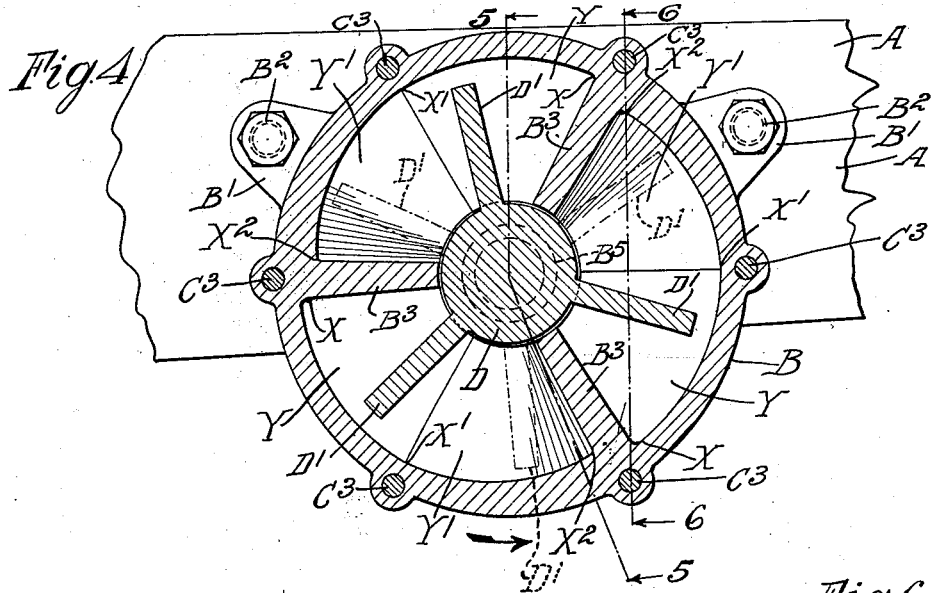
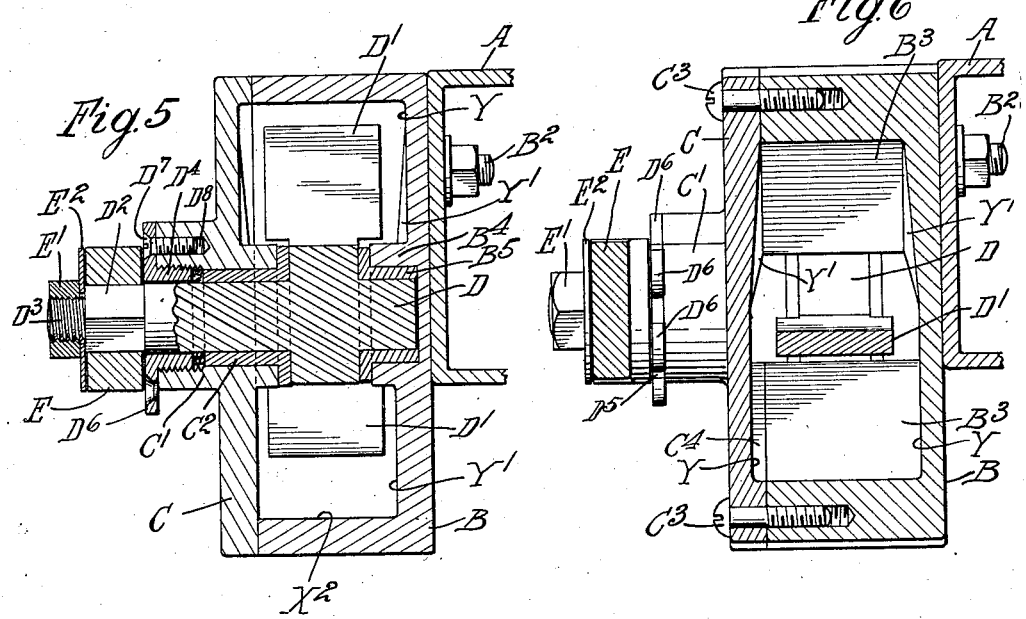

Aug. 4, 1931. C. H. CHAPIN 1,817,675
SHOCK ABSORBING DEVICE
Filed Dec. 12, 1928 3 Sheets-Sheet 3
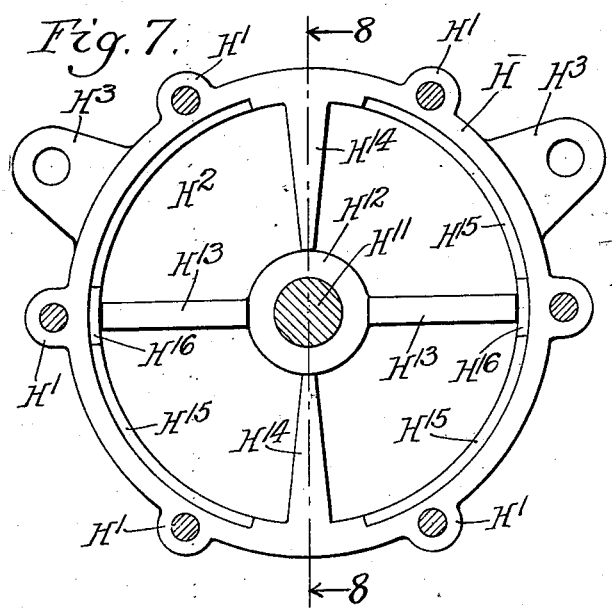
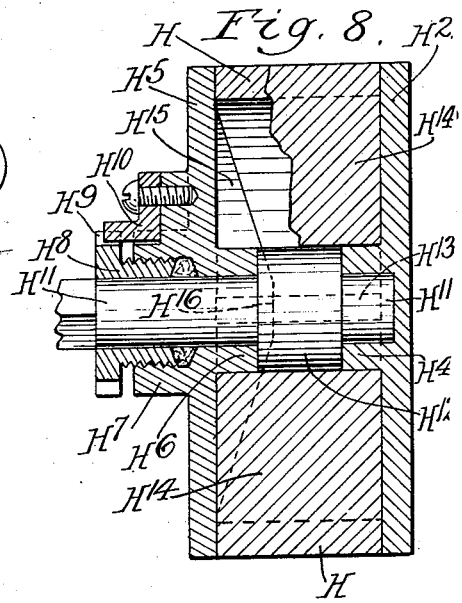
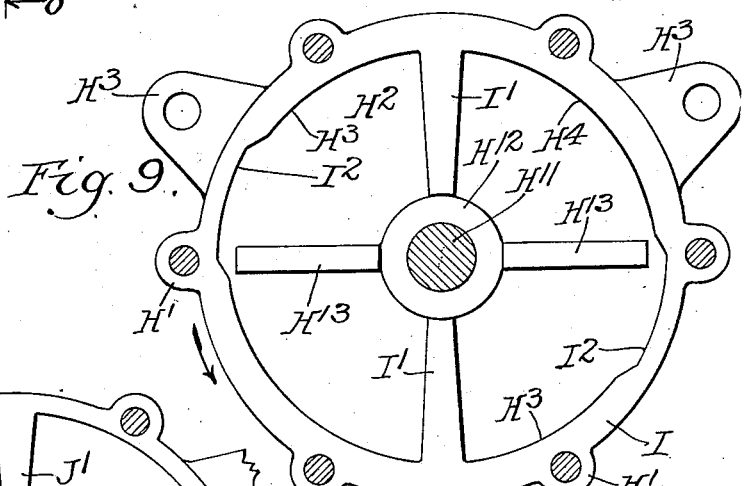
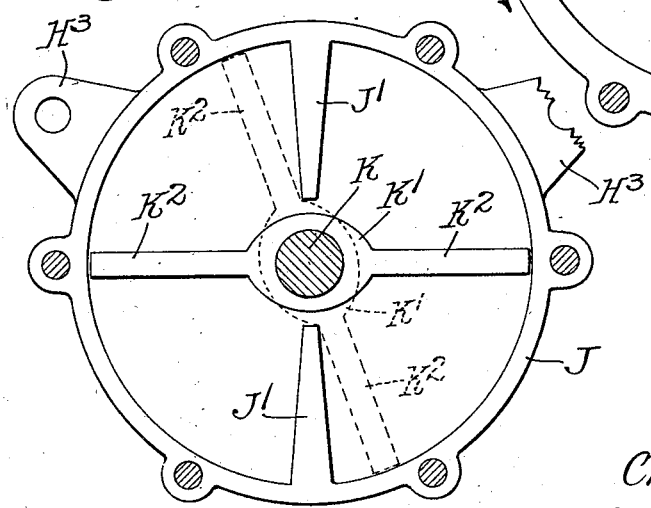
Inventor
Charles H. Chapin
by Parker & Carter
Attorneys.

Patented Aug. 4, 1931

1,817,675

UNITED STATES PATENT OFFICE

CHARLES H. CHAPIN, OF CHICAGO, ILLINOIS

SHOCK ABSORBING DEVICE

Application filed December 12, 1928. Serial No. 325,556.

This invention relates to a shock absorbing device and is particularly adapted for use in connection with automotive vehicles. It has for one object to provide a graduated resistance to absorb shocks imparted to the vehicle spring. Another object is to provide means whereby the shock is at first resisted to a relatively slight degree and then as the depression of the spring increases, a progressive increasing resistance to further movement occurs. When the reverse movement occurs the resistance is decreased in proportion to the amount of movement so that at first resistance to reverse movement is considerable and is gradually reduced. Other objects will appear from time to time in the course of the specification and claims.

The invention is illustrated more or less diagrammatically in the accompanying drawings wherein—

Figure 1 is a side elevation of a vehicle wheel and frame member, with parts in section;

Figure 2 is a horizontal cross section taken on line 2—2 of Figure 1, on an enlarged scale;

Figure 3 is a transverse vertical cross section taken on line 3—3 of Figure 2;

Figure 4 is a longitudinal vertical cross section taken on line 4—4 of Figure 2;

Figure 5 is a transverse, generally vertical cross section taken on line 5—5 of Figure 4;

Figure 6 is a transverse vertical cross section taken on line 6—6 of Figure 4;

Figure 7 is an elevational view with parts in section showing a further modification;

Figure 8 is a transverse vertical cross section on line 8—8 of Figure 7;

Figure 9 is a view similar to Figure 7 showing a further modification;

Figure 10 is a similar view showing a further modification.

Like parts are designated by like characters throughout the specification and drawings.

A is a vehicle frame. $A^1$ is a spring removably mounted upon the vehicle frame at one end as at $A^2$ and joined at its other end to a shackle $A^3$ which is pivotally mounted on the vehicle frame as at $A^4$. $A^5$ is an axle which carries at each end wheels $A^6$. The spring $A^1$ is fastened by means of shackles $A^8$ to the axle $A^5$.

B is a shock absorber housing provided with two or more ears $B^1$ adapted to receive bolts $B^2$ by means of which the housing is fastened to the frame member A. The housing B is preferably provided with three generally radially positioned partitions $B^3$ which join the outer wall B of the housing and terminate short of the center of the housing, thereby leaving a central opening. The peripheral wall of the housing B is of varying thickness. On one side of each of the partitions $B^3$ the wall is at its thickest, as at X. From this point to a point $X^1$ the thickness of the peripheral wall is substantially constant. From the point $X^1$ to a point $X^2$ adjacent the next partition the wall is progressively thickened so that it is thickest at the point $X^2$. All of the chambers formed by the partition are preferably alike in this respect.

The side wall of the housing B is provided in each compartment with a generally flat portion Y and with a progressively inwardly inclined portion $Y^1$.

The side wall of the housing B is provided with a central bearing receiving portion $B^4$. It is adapted to receive a bushing $B^5$.

C is a housing cover which forms the outer side of the housing. It has a bearing receiving enlargement $C^1$ adapted to receive a bushing $C^2$. The cover C is fastened to the housing proper B by means of screws $C^3$ or any other suitable means of attachment. The interior face of the cover C is shaped to correspond to the side wall of the housing B so as to provide symmetrical chambers within the shock absorber housing as a whole. Thus the cover C has radially positioned raised portions $C^4$ which correspond to the partitions $B^3$. The sides of the chambers described by the raised portions $C^4$ are provided with flat spaces and inclined spaces which correspond to the portions Y, $Y^1$ of the rear wall of the housing B. The effect thus of the shock absorber housing as a whole is to provide three chambers, each of which has a portion of substantially constant size and each of which has an adjoining portion of decreasing size in which the two side walls are depressed inwardly and the outer or peripheral wall is also depressed inwardly.

D is a rotor shaft. It is supported in the bushings $B^5$ and $C^2$. It is provided with a plurality of paddles $D^1$ and has an outwardly projecting square end $D^2$ and terminates in a threaded portion $D^3$. $D^4$ is a member adapted to assist in retaining packing and to serve also to exclude dust and dirt. It penetrates within the portion $C^1$ and is provided with an outwardly extending flange $D^5$ which carries a plurality of perforated ears $D^6$. The member $D^4$ may be secured for adjustment into the portion $C^1$ and it is held in adjusted position by means of a screw $D^7$ which engages and holds one of the perforated ears $D^6$, the screw $D^7$ being seated in a perforation $D^8$ in the portion $C^1$ of the cover C.

E is a lever arm positioned on the squared end $D^2$ of the shaft D. It is held against displacement by means of a nut $E^1$. $E^2$ is a washer between the nut $E^1$ and the lever arm E.

Attached to the outer end of the lever arm E is a connecting link F which is itself pivotally attached at its lower end to a clamping member G. This member is slotted at $G^1$ as shown, so as to engage a portion of the axle $A^5$ and may be riveted or bolted thereupon by a member $G^2$.

As shown in Figure 7, the device consists of a casing or housing H provided with enlargements $H^1$ to receive attaching means which will be described below. $H^2$ is an outside cover plate having perforated ears $H^3$ by means of which the device may be attached to a vehicle. $H^4$ is a hub portion adapted to receive the shaft of the rotor. $H^5$ is an inner cover plate provided with an inner hub portion $H^6$ and an interiorly threaded pocket $H^7$. $H^8$ is a packing gland adapted to be threaded within said pocket and it is provided on its outer edge with a notched flange $H^9$. $H^{10}$ is a fastening device adapted to fit within one of the notched flanges $H^9$ and to be screwed to the cover $H^5$ as shown, to prevent accidental rotation of the packing gland. $H^{11}$ is the shaft of a rotor provided with an enlargement $H^{12}$. The shaft is fitted at one end within the hub $H^4$ and at the other in the bearing portion $H^6$. $H^{13}$, $H^{13}$ are paddles on the rotor shaft. $H^{14}$, $H^{14}$ are preferably integral divisions or partitions with the housing H. $H^{15}$, $H^{15}$ are oppositely placed depressions cut or formed in one side of the interior of the casing H. Each of these has a flat center portion $H^{16}$.

In the form shown in Figure 9 the parts are generally the same as those shown in connection with Figures 7 and 8, except that instead of the casing H, the casing I is shown. It has partitions $I^1$, $I^1$ which contact the enlarged portion $H^{12}$ on the shaft $H^{11}$ in the manner described in connection with the preceding form. The interior of the casing I is provided with two oppositely placed notches $I^2$. Positioned in a clockwise direction from each of these notches is a relatively short, inclined portion $H^3$. This portion is gradually thickened from the notch $I^2$ to the adjacent parts $I^1$. Positioned in a counter-clockwise direction from each of the notches $I^2$ is a second, tapered, inclined portion $H^4$. These are relatively longer than the portions $H^3$ and each is thinnest adjacent its notch $I^2$ and thickest adjacent its partition $I^1$. The construction of the cover plates is generally the same as in the preceding form.

As shown in Figure 10, a casing J is used. This casing is provided with two partitions $J^1$, $J^1$. The cover plate herein is the same as that described above in connection with Figures 7, 8 and 9. The curvature of the interior of the casing J is concentric throughout. A different rotor is used from that described above. K is a shaft. Positioned upon this shaft is a generally elliptical hub $K^1$ and a pair of paddles $K^2$.

It will be obvious that while I have shown and described an operative device, many changes may be made in the size, shape, relation and distribution of parts without departing from the spirit of my invention and I wish therefore my description and showing to be considered as in a large measure diagrammatic.

The use and operation of my invention are as follows:

When the parts are assembled as shown in Figures 1 to 6, inclusive, the interior of the housing is filled with liquid, grease, oil, glycerine or any suitable resistance element. The means of filling the receptacle are not shown, as they form no particular part of the present invention. Any suitable means may be used, so long as they serve to permit the filling of the receptacle and the removal of air. When the housing is filled with the resisting material, the shock absorber is positioned as shown. Two may be used, or four. The mounting is such that motion of the paddles upon the depressing of the spring is in the direction of the arrow as shown in Figures 1 and 4. It will be clear that when the spring is depressed, the connecting link F is forced upwardly. This raises the lever E upwardly and rotates the paddles in the direction of the arrow. During the earlier stages of the motion the resistance to rotation of the paddles is simply that of the fluid itself and the fluid may escape about the edges of the paddles. As the motion of the paddles continues they pass the flat portions Y and move across or along the inclined portions $Y^1$. Since these portions converge inwardly toward each other and since the thickened portion of the peripheral wall occurs also in this portion of the housing, the paddles are moving within a constantly decreasing chamber and thus escape of material past the sides and ends of the paddles is increasingly resisted with each further movement. The construction shown thus provides means for permitting at first a constantly resisted movement and thereafter a progressively increasing resisted movement. In the reverse movement the resistance to movement of the paddles is at first progressively decreased and then it remains constant as the paddles move along the flat portions Y.

The operation of the form of the device shown in Figures 7 and 8 is generally the same as that of the forms described above. There are but two paddles instead of three and instead of the tapering walls and the tapering bottom of the paddle chambers, as shown for example in Figures 4 and 5, a notch of varying width is cut in the outer or peripheral wall of each of the chambers and thus, as the paddle moves along this notch, an escape past the end of the paddle of varying cross section is provided.

In the form illustrated in Figure 9, two paddles are used as in Figures 7 and 8 but instead of the notch or groove which is cut in the peripheral wall of the paddle chamber, the paddle chamber is somewhat tapered and the depressions I² are formed in the outer or peripheral wall. The operation of the device is generally the same as that described above, since the depressions I² and the shape of the walls H³ provide an escape of varying cross sectional area past the paddles and thus provides for the graduated resistance desired.

In Figure 10 only two paddles are used. The paddle member or hub K¹ has an oval or elliptical cross section and thus as it moves about the axis of the shaft K the clearance between the hub K¹ and the partitions J¹ is varied, being at its maximum when the paddle is in the position shown in full lines in Figure 10 and being cut off completely when the paddles reach the dotted line position of Figure 10. The paddle assembly in its movement thus furnishes the varying or graduated resistance due to the change in the size of the escape opening.

I claim:

1. In a hydraulic shock absorber, a casing provided with a chamber and forming a stator, a rotor adapted to be rotated with relation to the casing, the rotor including an imperforate paddle, the chamber within which such paddle is positioned being of constant width and depth throughout a portion of its size and of progressively decreasing width and depth throughout a portion of its size whereby the resistance to motion of the paddle within the chamber is at first constant and subsequently progressively increasing.

2. In a hydraulic shock absorber, a casing provided with a plurality of chambers and forming a stator, a rotor adapted to be rotated with relation to the casing by means of the vehicle movement, the rotor including a plurality of imperforate paddles, the chamber within which such rotor is positioned being of progressively decreasing width and depth throughout a portion of its size whereby the resistance to motion of the paddle within the chamber is progressively increasing.

3. In a hydraulic shock absorber, a casing provided with a plurality of chambers and forming a stator, a rotor adapted to be rotated with relation to the casing by means of the vehicle movement, the rotor including a plurality of solid, imperforate paddles, the chamber within which such rotor is positioned being of constant width and depth throughout a portion of its size and of progressively decreasing width and depth throughout a portion of its size whereby the resistance to motion of the paddle within the chamber is at first constant and subsequently progressively increasing.

4. In a hydraulic shock absorber, a casing provided with a chamber and a rotor positioned within said chamber and adapted to be moved with relation to said casing by the movement of a vehicle upon which the shock absorber is mounted, the side walls of said chamber being provided in their sides with inwardly inclined portions.

5. In a hydraulic shock absorber, a casing provided with a chamber and a rotor positioned within said chamber and adapted to be moved with relation to said casing by the movement of a vehicle upon which the shock absorber is mounted, the side walls of said chamber being provided in their sides with inwardly inclined portions, the inner peripheral wall of said chamber being drawn about a reducing radius through a portion of its length.

6. In a hydraulic shock absorber, a casing provided with a chamber and a rotor positioned within said chamber and adapted to be moved with relation to said casing by the movement of a vehicle upon which the shock absorber is mounted, the side walls of said chamber being provided in their sides with flat portions and with inwardly inclined portions.

7. In a hydraulic shock absorber, a casing provided with a chamber and a rotor positioned within said chamber and adapted to be moved with relation to said casing by the movement of a vehicle upon which the shock absorber is mounted, the side walls of said chamber being provided in their sides with flat portions and with inwardly inclined portions, the inner peripheral wall of said chamber being drawn about a reducing radius through a portion of its length.

8. In a hydraulic shock absorber, a casing provided with a chamber and a rotor positioned within said chamber and adapted to be moved with relation to said casing by the movement of a vehicle upon which the shock absorber is mounted, the side walls of said chamber being provided in their sides with flat portions and with inwardly inclined portions, the inner peripheral wall of said chamber being drawn about a constant radius through a portion of its length and about a reducing radius through another portion of its length.

9. In a hydraulic shock absorber, a casing provided with a chamber and a rotor positioned within said chamber and adapted to be moved with relation to said casing by the movement of a vehicle upon which the shock absorber is mounted, the side walls of said chamber being provided in their sides with flat portions and with symmetrically inwardly inclined portions, the inner peripheral wall of said chamber being drawn about a constant radius through a portion of its length and about a reducing radius through another portion of its length.

Signed at Chicago, county of Cook and State of Illinois, this 8th day of December, 1928.

CHARLES H. CHAPIN.